INTEGRATING CIRCUITS WITH GATING AND RESETTING PROVISIONS

Filed July 14, 1966 2 Sheets-Sheet 1

INVENTOR
GERALD B. HOLLINS
BY Louis A. Kline
Glenn Bowers
HIS ATTORNEYS

Sept. 2, 1969 G. B. HOLLINS 3,465,167
INTEGRATING CIRCUITS WITH GATING AND RESETTING PROVISIONS
Filed July 14, 1966 2 Sheets-Sheet 2

INVENTOR
GERALD B. HOLLINS
BY Louis A. Kline
Glenn Bones
HIS ATTORNEYS

United States Patent Office 3,465,167
Patented Sept. 2, 1969

3,465,167
INTEGRATING CIRCUITS WITH GATING AND RESETTING PROVISIONS

Gerald B. Hollins, Dayton Ohio, assignor to The National Cash Register Company, Dayton, Ohio, a corporation of Maryland Filed July 14, 1966, Ser. No. 565,301
Int. Cl. G06g 7/12; H03k 17/00, 3/00
U.S. Cl. 307—229 9 Claims

ABSTRACT OF THE DISCLOSURE

An integrating circuit that includes an amplifier with a feedback capacitor coupled between its input and output terminals is provided with a gating transistor that is coupled in shunt with the input impedance path of the amplifier so as to control the application of input signals to the amplifier, and also with means to reset the feedback capacitor which includes a current steering circuit.

This invention relates generally to electrical circuits that integrate an electrical waveform and in particular to integrating circuits with gating and resetting provisions.

The present invention provides an extremely simple integrating circuit that may be gated and reset by digital logic signals. The integrating circuit of the present invention may be easily fabricated by integrated circuit production methods, since, aside from the feedback capacitor, only diodes, transistors, and resistors may be employed in the preferred embodiment of this invention. A number of integrating circuits of the present invention may be connected in a processing system, so that each integrating circuit may be individually controlled by a separate gate circuit, while all of the integrating circuits may be simultaneously reset by a single reset signal from a master reset circuit.

It is therefore an object of the present invention to provide a gated, resettable operational integrating amplifier circuit.

It is a further object of the present invention to provide an operational integrating amplifier circuit which may be easily fabricated by integrated circuit production methods.

Figures 1, 2:
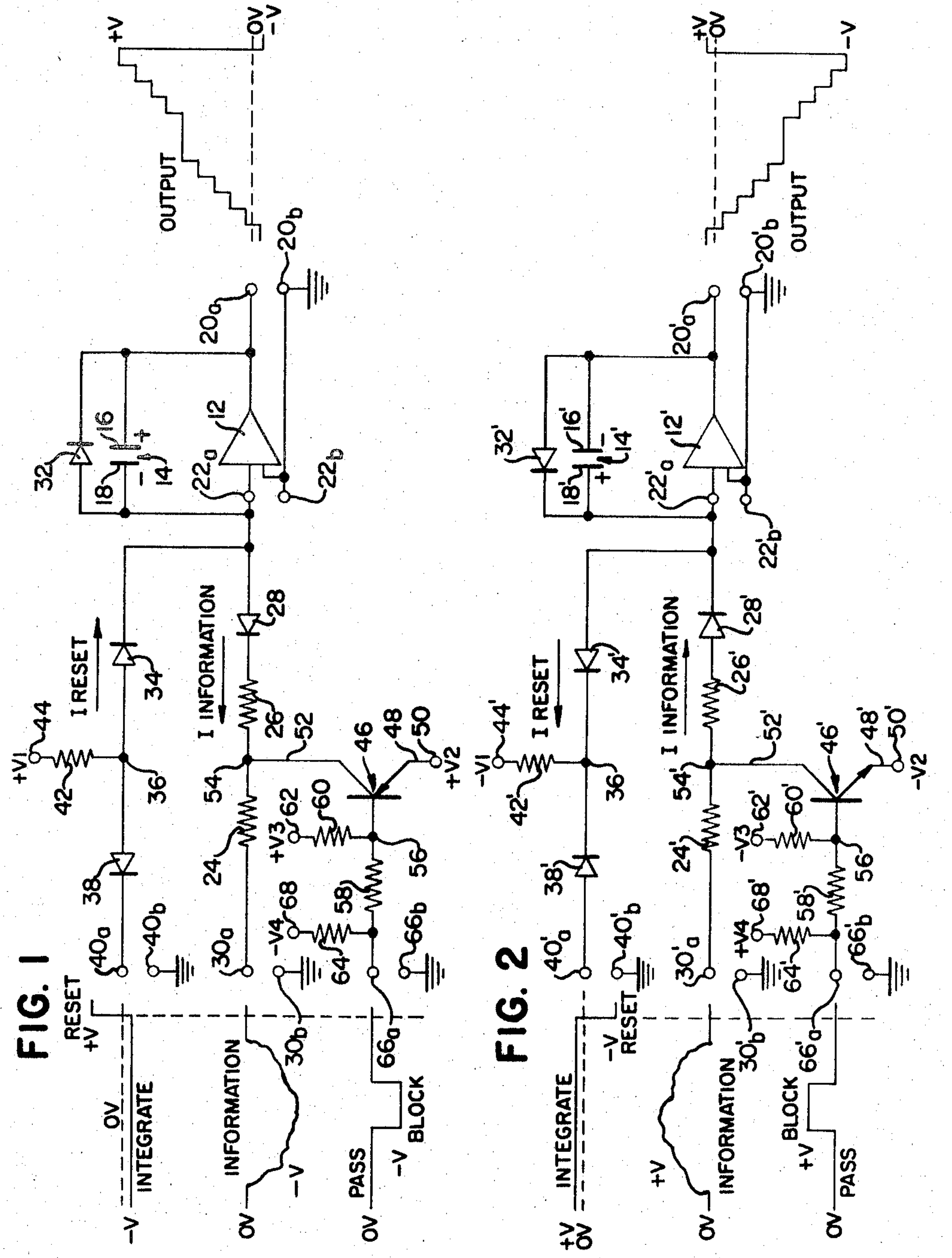
FIGURE 1 is a schematic diagram of one embodiment of the present invention.
FIGURE 2 is a schematic diagram of another embodiment of the present invention.

FIGURE 1 shows one embodiment of the present invention. The integrating circuit includes a signal-inverting Class A amplifier circuit 12, which has a feedback capacitor 14 connected between the input terminal $22_a$ and the output terminal $20_a$ of the amplifier. The capacitor 14 has a plate 16 connected to the output terminal $20_a$ and a plate 18 connected to the input terminal $22_a$. The use of a capacitive feedback path with an amplifier to produce an output signal which is the integral of the input signal to the amplifier is well known in the art and will not be discussed in detail.

The amplifier 12 is a signal-inverting amplifier that is biased, by methods known in the art, to produce a ground potential on the output terminal $20_a$ when the potential on the input terminal $22_a$ is at a ground potential. When the potential on the input terminal $22_a$ becomes negative as the input potential on the terminal $30_a$ becomes negative, the potential on the output terminal $20_a$ becomes positive, and the capacitor 14 acquires a charge which represents the time integral of the total negative input signal applied across the input terminals $30_a$ and $30_b$ of the circuit. The charge on the capacitor 14 produces a negative voltage on the plate 18 and a positive voltage on the plate 16. The negative input voltage appearing across the terminals $30_a$ and $30_b$ supplies a current to the terminal $22_a$ through a transmission path which includes the resistors 24 and 26 and the diode 28. The resistor 24 is connected to the terminal $30_a$, which is coupled to a source of negative voltage excursions (not shown), which supplies the input information signal that is integrated. The resistor 26 is connected to the resistor 24 and to the cathode of the diode 28, the anode of which is connected to the input terminal $22_a$. The diode 32 is connected with its cathode connected to the output terminal $20_a$ and its anode connected to the input terminal $22_a$. The diode 34 is connected with its anode connected to the junction 36 and its cathode connected to the input terminal $22_a$. The diode 38 is connected with its anode connected to the junction 36 and its cathode connected to the reset terminal $40_a$, which is coupled to a source of reset control signals (not shown). The resistor 42 is connected between the positive potential supply 44 and the junction 36. The resistor 42 and the diodes 38 and 34 form a conventional diode current steering gate.

The reset signal applied across the terminals $40_a$ and $40_b$ is derived from reset circuitry (not shown), and this signal may be applied to a large number of integrating circuits simultaneously. The reset signal is normally at a negative potential level whenever information signals are present across the terminals $30_a$ and $30_b$, but goes to a positive voltage level when it is desired to reset the integrating circuit.

Thus, when an information signal is received across the terminals $30_a$ and $30_b$ and the gate transistor 46 is not conducting, the amplifier 12 amplifies and inverts the negative input signal that appears on the amplifier input terminal $22_a$. The capacitor 14 acquires a charge which represents the time integral of the information signal which is applied across the terminals $30_a$ and $30_b$ during the information-receiving period. During this period, while the capacitor 14 is acquiring a charge, the diode 32 is reverse-biased and has a high impedance.

The gate transistor 46 is connected in a grounded emitter configuration, with the emitter 48 connected to a terminal 50, which is at a low positive potential, and the collector 52 connected to the junction 54 between the resistors 24 and 26. The base 56 of the transistor 46 is connected to the gate terminal $66_a$ via the input resistor 58, and to the terminal 62, which is connected to a positive potential supply, via the resistor 60. The resistor 64 is connected between the gate input terminal $66_a$, which is coupled to a source of gate signals (not shown), and the terminal 68, which is connected to a negative potential supply. The resistors 58, 60, and 64, with their associated potential sources, form a bias network for the transistor 46.

The transistor 46 in the embodiment of FIGURE 1 is a PNP transistor, and the biasing network is designed to insure that the transistor 46 is cut off whenever the gate control signal applied to the terminal $66_a$ is at a ground potential, thereby allowing a current to flow through the resistors 24 and 26 and the diode 28 to the input terminal $22_a$ in response to an information signal applied across the information input terminals $30_a$ and $30_b$.

When the gate control signal applied to the terminal $66_a$ is at a negative potential, the transistor 46 is biased to saturation, thereby effectively coupling the positive potential on the terminal 50 to the junction 54 to reverse-bias the diode 28. Consequently, when the gate control signal on the gate input terminal $66_a$ is at a negative potential level, the information signal applied across the information input terminals $30_a$ and $30_b$ is shunted through the transistor 46. The reverse-biased diode 28 prevents voltage variations which occur across the collector-emitter path of the transistor 46 as a result of this current from affecting the amplifier 12. The resistor 24 minimizes the loading effect of the integrating circuit on the information signal source when the transistor 46 is in saturation.

To reset the integrating circuit and to prepare the circuit for new information signals, it is necessary to discharge the charge accumulated by the capacitor 14. The application of a negative potential to the cathode of the diode 38 by the reset circuitry (not shown) connected to the terminal $40_a$ forward-biases the diode 38, causing conduction through the diode 38 during the information-receiving period. The voltage at the junction 36 becomes essentially equal to the negative voltage on the terminal $40_a$ and reverse-biases the diode 34, thereby preventing current flow through the diode 34.

When it is desired to reset the integrated circuit, the reset circuitry supplies a positive polarity voltage level to the cathode of the diode 38 through the terminal $40_a$, so as to reverse-bias the diode 38, thereby preventing conduction through the diode 38. The voltage at the junction 36 now becomes more positive, and the diode 34 is forward-biased as a result and a substantially constant current flows from the terminal 144 through the forward-biased diode 34 and the resistor 42, to the input terminal $22_a$. The current flow to the input terminal $22_a$, due to the positive reset signal on the terminal $40_a$, is opposite in direction to the current flow to the terminal $22_a$ due to the negative information signals that are applied across the terminals $30_a$ and $30_b$ during the information-receiving portion of the cycle. A negative polarity gate control signal is applied to the gate input terminal $66_a$ only during the information-receiving period, and a ground potential is applied to the gate input terminal $66_a$ during the reset period in the preferred embodiment. Therefore, in the described embodiment, the only current supplied to the input terminal $22_a$ during the reset period is the current supplied through the diode 34. While a positive polarity reset signal is applied across the terminals $40_a$ and $40_b$ in the described embodiment only when information-bearing negative polarity signals are not present across the terminals $30_a$ and $30_b$, it is possible to modify the integrating circuit so that it resets even when an information signal is present across the terminals $30_a$ and $30_b$ merely by decreasing the resistance of the resistor 42, thereby allowing more reset current to flow through the diode 34 into the input terminal $22_a$ during the reset period. In this case, the gate transistor 46 may be either in cut-off or in saturation during the reset period. The current supplied to the terminal $22_a$ through the diode 34 tends to reverse the charge on the capacitor 14. The diode 32, however, becomes forward-biased as the potential on the input terminal $22_a$ becomes positive, and this holds the plates 16 and 18 of the capacitor 14 to a potential difference level equal to the forward voltage drop of the diode 32 following discharge of the capacitor 14, thereby preventing the capacitor 14 from acquiring any substantial charge with a polarity opposite to the polarity that results from the information signal. Furthermore, while the reset circuit of the preferred embodiment places the input terminal $22_a$ at a voltage that is essentially equal to a ground potential following a reset signal, this terminal could be placed at a different voltage level following a reset signal merely by inserting a voltage source between the cathode of the diode 32 and the output terminal $20_a$.

The circuit shown in FIGURE 2 is similar to that shown in FIGURE 1 except that the terminal 44' is at a negative instead of positive potential, the transistor 46' is an NPN transistor instead of a PNP transistor, the connections to the anodes and the cathodes of the diodes 32', 34', and 38' are interchanged, and the polarities of the various input and control signals and bias supplies are adjusted accordingly. The analogy between the operation of the circuit of FIGURE 2 and the circuit of FIGURE 1 will be apparent when the schematic of FIGURE 2 is considered in conjunction with the description of the circuit of FIGURE 1.

Figure 3:
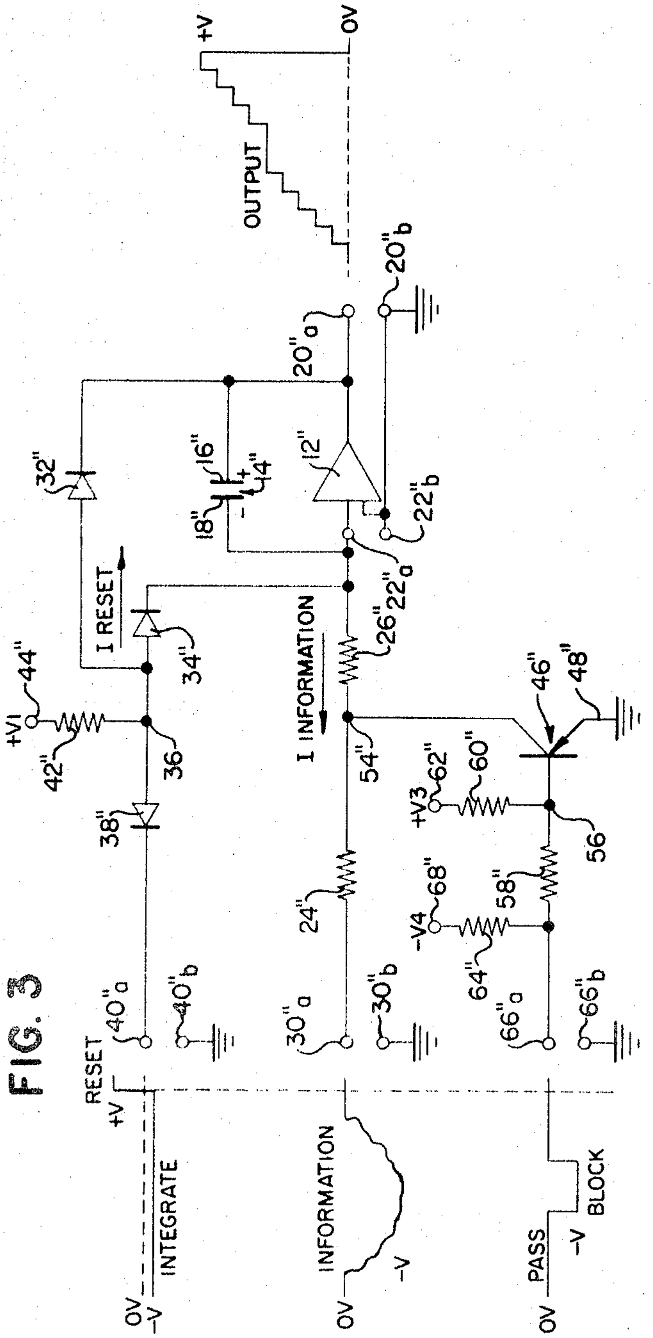
FIGURE 3 is a schematic of a modified form of the circuit of FIGURE 1.

FIGURE 3 shows another modification of the invention. In FIGURE 3, the emitter 48'' of the transistor 46'' is grounded instead of being held at a low positive potential, and the diode 28 of FIGURE 1 is also removed. The gate circuit of FIGURE 3, it will be apparent, will still be effective to control passage of information signals to the input terminal $22_a''$. However, in the circuit of FIGURE 3, voltage variations which appear across the emitter-collector path of the transistor 46'' when this transistor is saturated will reduce the accuracy of this embodiment of the integrating circuit.

A further modification is accomplished in the circuit of FIGURE 3 by connecting the anode of the diode 32'' to the anode of the diode 34. In FIGURE 1, the potential at the input terminal $22_a$ is slightly more positive than the potential at the output terminal $30_a$ due to the forward voltage drop across the diode 32. The connection of the diode 32'' to the junction 36'' in FIGURE 3 results in a potential at the input terminal $22_a''$ which is substantially equal to the potential present at the output terminal $20_a''$ following a reset signal, due to the compensating forward voltage drop of the diode 34''. The circuit configuration of FIGURE 3, however, does not offer the input terminal $22_a''$ a substantially constant current source during the reset period, and, as the voltage on the input terminal $22_a''$ approaches a ground potential level, the voltage drop across the diode 34'' decreases, resulting in increased reset time requirements.

What is claimed is:

1. An integrating circuit comprising:
(a) a first input terminal for receiving an information signal,
(b) a second input terminal,
(c) an amplifying means having an input junction and an output junction,
(d) a capacitor coupling the input junction of the amplifying means to the output junction of the amplifying means,
(e) a transmission path coupling the first input terminal to the input junction of the amplifying means,
(f) reset means coupled between the second input terminal and the input junction of the amplifying means constructed to discharge the charge accumulated by the capacitor during the time that information signals are received on the first input terminal, the reset means comprising a first diode, a second diode, and a resistor, like electrodes of the two diodes being connected together, the resistor being connected between the junction point of the like electrodes and a voltage source, the other electrode of the first diode being connected to the second input terminal and the other electrode of the second diode being connected to the input junction of the amplifying means, the arrangement being such that the application of the reset signal to the second input terminal reverse-biases the first diode and forward-biases the second diode, causing current to flow which discharges the capacitor, and
(g) means to equalize the potentials at the input and the output junctions of the amplifying means following discharge of the capacitor.

2. An integrating circuit as in claim 1 wherein the circuit has a control terminal for connection to a source of a bistate control signal and a switching means having a shunt impedance path coupled between a point on the transmission path and a reference potential and a control junction coupled to the control terminal, the switching means being switchable between states wherein the impedance path has a high impedance and a low impedance, respectively, depending on the state of the control signal that is applied to the control terminal, the switching means being in an appropriate state to shunt the information signal from the input junction of the amplifying means when the control signal is in one state, and the switching means being in its other state to permit transmission of the information signal to the input junction of the amplifying means when the control signal is in its other state.

3. An integrating circuit as in claim 2 wherein the switching means comprises a transistor having its base coupled to the control terminal, its collector connected to the point on the transmission path, and its emitter connected to the reference potential.

4. A circuit as in claim 1 wherein the means to equalize the potentials at the input and the output junctions of the amplifying means following discharge of the capacitor is a third diode, which is connected between the input and the output junctions of the amplifying means.

5. An integrating circuit as in claim 4 wherein the circuit has a control terminal for connection to a source of a bistate control signal and a switching means having a shunt impedance path coupled between a point on the transmission path and a reference potential and a control junction coupled to the control terminal, the switching means being switchable between states wherein the impedance path has a high impedance and a low impedance, respectively, depending on the state of the control signal that is applied to the control terminal, the switching means being in an appropriate state to shunt the information signal from the input junction of the amplifying means when the control signal is in one state, and the switching means being in its other state to permit transmission of the information signal to the input junction of the amplifying means when the control signal is in its other state.

6. An integrating circuit as in claim 5 wherein the switching means comprises a transistor having its base coupled to the control terminal, its collector connected to the point on the transmission path, and its emitter connected to the reference potential,

7. A circuit as in claim 1 wherein the means to equalize the potentials at the input and the output junctions of the amplifying means following discharge of the capacitor is a third diode, which is connected between the output junction of the amplifying means and the junction point of the like electrodes of the first and second diodes.

8. An integrating circuit as in claim 7 wherein the circuit has a control terminal for connection to a source of a bistate control signal and a switching means having a shunt impedance path coupled between a point on the transmission path and a reference potential and a control junction coupled to the control terminal, the switching means being switchable between state wherein the impedance path has a high impedance and a low impedance, respectively, depending on the state of the control signal that is applied to the control terminal, the switching means being in an appropriate state to shunt the information signal from the input junction of the amplifying means when the control signal is in one state, and the switching means being in its other state to permit transmission of the information signal to the input junction of the amplifying means when the control signal is in its other state.

9. An integrating circuit as in claim 8 wherein the switching means comprises a transistor having its base coupled to the control terminal, its collector connected to the point on the transmission path, and its emitter connected to the reference poential.

References Cited

UNITED STATES PATENTS

| | | | |
|---|---|---|---|
| 3,167,718 | 1/1965 | Davis et al. | 307—229 XR |
| 3,292,011 | 12/1966 | Casey et al. | 307—261 XR |
| 3,308,386 | 3/1967 | Wai-kee Wong | 328—208 XR |
| 3,311,740 | 3/1967 | Urban | 235—183 |

ARTHUR GAUSS, Primary Examiner

S. T. KRAWCZEWICZ, Assistant Examiner

U.S. Cl. X.R.

235—183; 307—227, 243; 328—127, 186